(12) United States Patent
Lien

(10) Patent No.: US 10,450,633 B2
(45) Date of Patent: Oct. 22, 2019

(54) RECOVERY OF LITHIUM FROM AN ACID SOLUTION

(71) Applicant: Larry Lien, Solana Beach, CA (US)

(72) Inventor: Larry Lien, Solana Beach, CA (US)

( * ) Notice: Subject to any disclaimer, the term of this patent is extended or adjusted under 35 U.S.C. 154(b) by 252 days.

(21) Appl. No.: 15/656,759

(22) Filed: Jul. 21, 2017

(65) Prior Publication Data

US 2019/0024212 A1  Jan. 24, 2019

(51) Int. Cl.
| | | |
|---|---|---|
| H01M 10/54 | (2006.01) | |
| B01D 61/58 | (2006.01) | |
| C22B 26/12 | (2006.01) | |
| B01D 61/02 | (2006.01) | |
| B01D 71/82 | (2006.01) | |
| C22B 3/16 | (2006.01) | |
| C22B 3/22 | (2006.01) | |
| B01D 61/14 | (2006.01) | |

(52) U.S. Cl.
CPC ............ *C22B 26/12* (2013.01); *B01D 61/022* (2013.01); *B01D 61/58* (2013.01); *B01D 71/82* (2013.01); *C22B 3/16* (2013.01); *C22B 3/22* (2013.01); *H01M 10/54* (2013.01); *B01D 61/145* (2013.01); *B01D 2311/02* (2013.01); *B01D 2311/25* (2013.01); *B01D 2317/025* (2013.01)

(58) Field of Classification Search
CPC ...... H01M 10/54; C22B 26/12; B01D 61/022; B01D 61/58
See application file for complete search history.

(56) References Cited

U.S. PATENT DOCUMENTS

| | | | |
|---|---|---|---|
| 4,636,295 A | 1/1987 | Ball et al. | |
| 6,821,430 B2 | 11/2004 | Andou et al. | |
| 9,484,606 B1 | 11/2016 | Sloop et al. | |
| 2007/0102359 A1* | 5/2007 | Lombardi | B01D 17/085 210/639 |
| 2011/0203929 A1 | 8/2011 | Buckley et al. | |
| 2012/0312126 A1* | 12/2012 | Yamaguchi | B01D 61/246 75/743 |
| 2013/0292333 A1 | 11/2013 | Sasaki et al. | |
| 2016/0045841 A1* | 2/2016 | Kaplan | B01J 19/0093 429/49 |
| 2017/0022617 A1* | 1/2017 | Magnan | C25B 1/16 |
| 2017/0187063 A1 | 6/2017 | Pistorino et al. | |
| 2018/0245180 A1* | 8/2018 | Cheng | C22B 26/12 |

OTHER PUBLICATIONS

International Search Report and Written Opinion of Correspondence PCT Application No. PCT/US2018/042378 dated Sep. 27, 2018.

* cited by examiner

*Primary Examiner* — James Lee
(74) *Attorney, Agent, or Firm* — Honigman LLP

(57) ABSTRACT

Methods of recovering lithium from a lithium source or a lithium-containing material using low pH solutions and membrane technologies to purify and concentrate the recovered lithium. The lithium sources may include a spent lithium-ion battery/cell, a lithium-containing mineral deposit, or other lithium containing materials. The processes described herein recovery the lithium after digestion of the lithium-containing material with a low pH solution through one or more acid-stable, semipermeable membranes.

10 Claims, 2 Drawing Sheets

RECOVERY OF LITHIUM FROM AN ACID SOLUTION

TECHNICAL FIELD

The present disclosure relates to methods for the recovery of lithium from a lithium-containing material, and more particularly, the recovery of lithium from lithium-containing material utilizing membrane separation of an acid solution.

BACKGROUND

Lithium-ion cells are the current choice for high frequency rechargeable batteries in devices such as, but not limited to, phones, movie cameras, hand-tools, laptop computers, and the like devices. In addition, with the expansion of electric cars and solar storage devices using lithium-ion batteries, lithium-based battery technology will likely be a preferred battery in the foreseeable future. Rechargeable lithium-ion batteries may have a relatively long useful life; however, the batteries eventually fail or are often discarded prior to failure and contribute to an increasing waste stream.

Despite claims that rechargeable lithium-ion batteries will last up to 6 or even 10 years of effective battery life for many of the small device batteries (that is, phones, computers, tools, etc.), a more realistic battery life is closer to 3 years. This real-battery-life average translates into a large amount of lithium available to be recovered from spent batteries by recycling. In view of the relatively short battery life of such batteries and the increasing demand in electronics and automobiles, it is expected the ultimate demand for lithium sources to substantially increase in the coming years. Both the demand for new lithium production from mined resources and the recycling of spent lithium ion batteries will complement the accelerated demand for lithium to be produced.

However, prior methods of metal recovery in spent batteries and other recyclable materials, such as pyrometallurgical or hydrometallurgical processing, tend to be inefficient or uneconomical when considering the relative small amounts of lithium available for recovery in conventional lithium-ion batteries and cells. For instance, a conventional lithium-ion cell, such as the popular 18650 lithium-ion cell, is a 3.7 or a 4.2 volt cell with up to about 8 total grams of lithium. Prior recovery methods are energy intensive and generally not economical for the recovery of lithium from spent batteries.

SUMMARY

Figure 1:
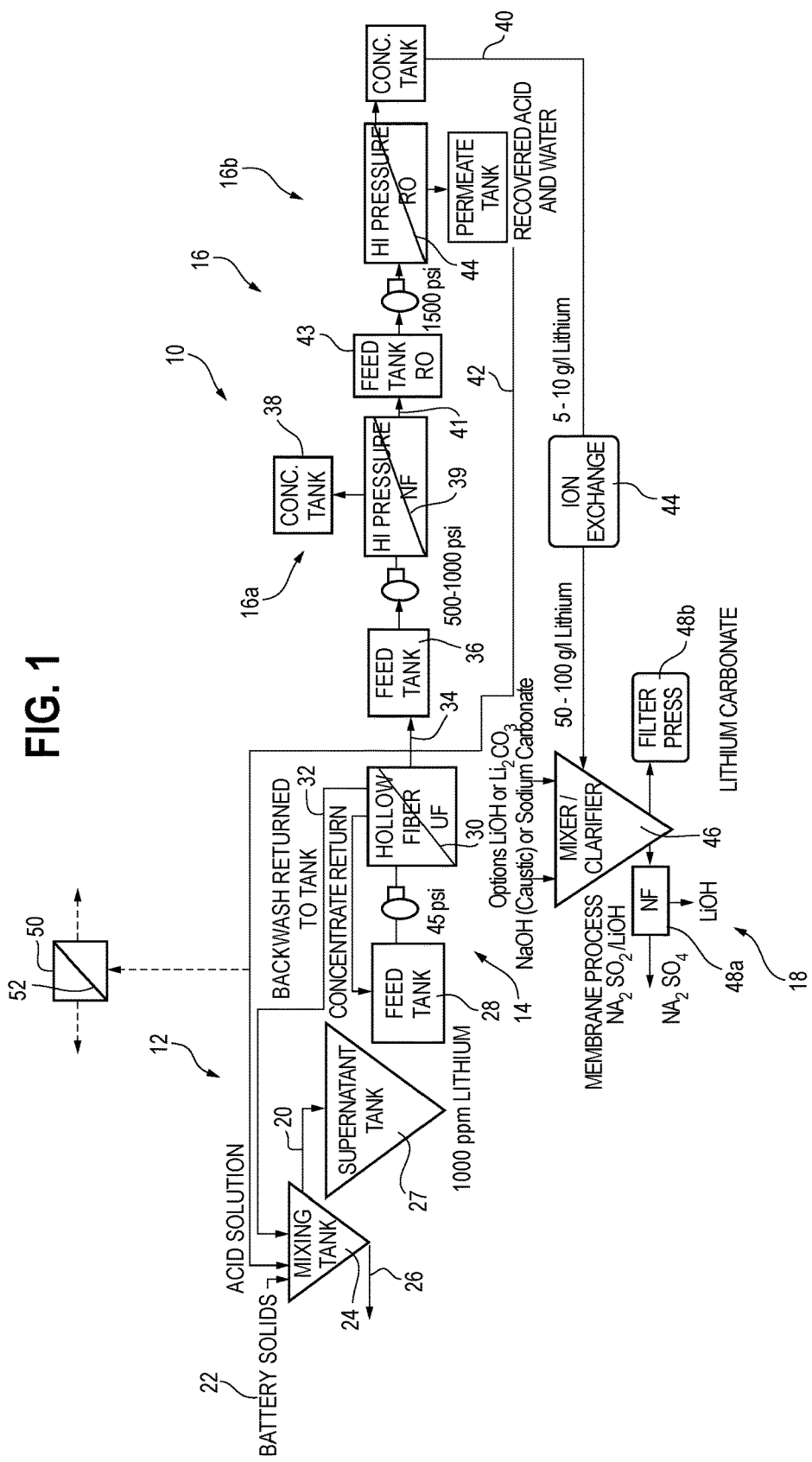
FIG. 1 is a flow diagram of an exemplary lithium recovery process.

In one aspect, the present disclosure provides a method of recovering lithium from a lithium-containing material. The method includes mixing a lithium-containing material in an acid solution to form an acidic lithium solution. The mixing occurs at a temperature of about 10° C. to about 100° C. The acidic lithium solution includes at least one or more of the acid solution, lithium, soluble organics, soluble metals, and suspended solids. After mixing, the acidic lithium solution is delivered to an ultrafiltration pretreatment membrane to retain a majority of the suspended solids and to permeate a filtered acidic lithium solution including at least one or more of the acid solution, the lithium, the soluble organics, and the soluble metals. Next, the filtered acidic lithium solution is delivered to a nanofiltration membrane to form a retentate and a permeate. The nanofiltration retentate includes one or both of the soluble organics and the soluble metals and the nanofiltration permeate forms a filtered acid and lithium solution including the acid solution and the lithium. The filtered acid and lithium solution is then delivered to a reverse osmosis membrane to form a retentate and permeate. The reverse osmosis retentate includes the lithium and the reverse osmosis permeate includes the acid solution. Lastly, the lithium is recovered as lithium salts from the reverse osmosis retentate and, the reverse osmosis permeate is optionally recycled to the mixing step.

The method of the previous paragraph may be combined with one or more additional method steps or features. These additional methods steps or features include one or more of the following: wherein the acid solution includes hydrochloric acid, sulfuric acid, nitric acid, acetic acid, citric acid, and combinations thereof; wherein the acid solution has a pH of about 2.5 or less; wherein the lithium-containing material is a lithium ion battery or a lithium-containing mineral deposit; wherein one or both of the nanofiltration membrane and the reverse osmosis membrane are chlorinated; wherein the ultrafiltration pretreatment membrane has a pore size of about 0.01 microns to about 0.5 microns and is operated at about 10 to about 100 psi; wherein the nanofiltration membrane has a pore size of about 0.0007 microns to about 0.0012 microns and is operated at about 200 to about 2000 psi; wherein the reverse osmosis membrane has a pore size of about 0.0005 microns to about 0.001 microns and is operated at about 200 to about 2000 psi; wherein the lithium-containing material is a lithium ion battery or cell including a metal oxide cathode, a carbon anode, an electrolyte, and a polymeric separator and wherein the mixing step includes placing the metal oxide cathode, the carbon anode, the electrolyte, and the polymeric separator in the acid solution; wherein the lithium-containing material is a lithium containing mineral deposit and wherein the mixing step includes a ratio of the lithium containing mineral deposit to the acid solution of about 1:2 to about 1:20 to leach the lithium from the lithium containing mineral deposit to form the acidic lithium solution; and/or wherein the mixing step of the lithium containing mineral deposit and the acid solution further includes a polymeric material selected from alkyl carbonate and mixtures of alkyl carbonates.

In another aspect, the present disclosure provides a method of recovering lithium from a lithium-containing material including the following method steps and features: first, a lithium-containing material is mixed in an acid solution having a pH of about 2.5 or less to form an acidic lithium solution. The mixing occurs at a temperature of about 10° C. to about 100° C. The acidic lithium solution includes at least one or more of the acid solution, lithium, soluble organics, soluble metals, and suspended solids. Second, the acidic lithium solution is then filtered in a semipermeable membrane to substantially retain the suspended solids and to substantially permeate one or more of the acid solution, the lithium, the soluble organics, and the soluble metals to form a filtered acidic lithium solution. Third, the filtered acidic lithium solution is next filtered in a first chlorinated semipermeable membrane to substantially retain one or both of the soluble organics and the soluble metals and to substantially permeate the acid solution and the lithium to form a filtered acid and lithium solution.

Fourth, the filtered acid and lithium solution is then filtered in a second chlorinated semipermeable membrane to substantially retain lithium and to substantially permeate the acid solution. Lastly, the lithium is recovered as lithium salts from the retained lithium and, optionally, the permeated acid solution from the second chlorinated semipermeable membrane is recycled to the mixing step.

The method of the previous paragraph may be combined with one or more additional method steps or features. These additional methods steps or features include one or more of the following: wherein the acid solution is selected from hydrochloric acid, sulfuric acid, nitric acid, acetic acid, citric acid, and combinations thereof; wherein the lithium bearing material is a lithium ion battery or a lithium-containing mineral deposit; wherein the semipermeable membrane is an ultrafiltration membrane having a pore size of about 0.01 microns to about 0.5 microns and operated at about 10 to about 100 psi; wherein the first chlorinated semipermeable membrane is a nanofiltration membrane having a pore size of about 0.0007 microns to about 0.0012 microns and operated at about 200 to about 2000 psi; wherein the second chlorinated semipermeable membrane is a reverse osmosis membrane having a pore size of about 0.0005 microns to about 0.001 microns and operated at about 200 to about 2000 psi; wherein the lithium-containing material is a lithium ion battery including a metal oxide cathode, a carbon anode, an electrolyte, and a polymeric separator and wherein the mixing step includes placing the metal oxide cathode, the carbon anode, the electrolyte, and the polymeric separator in the acid solution; wherein the lithium-containing materials is a lithium containing mineral deposit and wherein the mixing step includes a ratio of the mineral deposit to the acid solution of about 1:2 to about 1:20 to leach the lithium from the lithium containing mineral deposit to form the acidic lithium solution; and/or wherein the mixing step of the lithium containing mineral deposit and the acid solution further includes a polymeric material selected from alkyl carbonated and mixtures of alkyl carbonates.

DETAILED DESCRIPTION

The present disclosure describes methods of recovering lithium from a lithium source or a lithium-containing material using low pH solutions and membrane technologies to purify and concentrate the recovered lithium. The lithium sources may include a spent lithium-ion battery/cell, a lithium-containing mineral deposit, or other lithium containing materials to suggest a few exemplary lithium sources. The processes described herein recovery the lithium after digestion of the lithium-containing material with a low pH solution through one or more select acid-stable, semipermeable membranes, such as chlorinated acid-stable membranes. In some cases, the methods herein also include the ability to recycle desired processing streams to make the process cost effective and operative to recover high levels of lithium (and other components) as needed depending on the composition of the starting lithium source.

In some approaches, essentially the entire battery or cell is recyclable or essentially all the components of the battery/cell are recoverable so that they could be recycled and reused. The processes herein also utilize membrane separation technology to allow for the recovery of lithium, metals, and purified acids by permeating pure acid and rejecting lithium and metals into a small volume. This happens simultaneously using the membrane technology as it splits the feed into a smaller volume concentrate containing lithium and/or metals and a larger volume permeate. Both permeate and concentrate have value and, if needed, can be recovered for reuse. Thus, the processes herein allow not only for essentially the entire battery to be recycled, but also the acids used in the processing.

As used herein, a lithium-ion cell refers to the single or basic electrochemical unit that contains the base components of electrodes (cathode and anode), separator, and electrolyte. In the case of a common lithium-ion cell, this basic unit may be a cylindrical, prismatic, or pouch unit. A battery is more conventionally a collection of cells within an appropriate housing. A simple battery, such as one for a phone or hand-held tool for instance, may be a single cell. A complex battery, such as one for an electric automobile, may include thousands of cells in a collection of separate modules.

The anode or negative electrode of a lithium-ion cell may be a copper foil as the anode plate covered with graphite or some other carbon based material (such as graphene). The cathode or positive electrode may be a metal oxide and may include an aluminum foil as the cathode plate covered with cobalt nickel alloy, lithium cobalt oxide (LCO), lithium iron phosphate, lithium manganese oxides, lithium fluoride phosphate (LFP), lithium moly oxide (LMO) or other metal oxides such as nickel cobalt oxide (NCO) and the like. The electrolyte may include a mixture of polymeric organics, organic solvents, phosphates, fluorides and lithium salts and may include organic solvents and lithium, phosphate fluoride ($LiPF_6$). The cathode and anode are commonly separated by a polymeric separator, such as a polypropylene or polyethylene. The above components are included within a battery case, which may be a metal or polymeric laminate, such as a pouch, shell, or other enclosure. As discussed further herein, all of the above components can be recovered or recycled as needed for a particular application using the methods of the present application. One examples of a lithium-ion cell suitable for the processes herein is a conventional 18650 lithium-ion cell.

Turning to more of the specifics, exemplary methods of lithium recovery generally include first processing or treating the lithium-containing materials to digest the lithium and other materials in a low pH acid solution to solubilize the components and then the acid solution is processed through one or more membrane separation steps to recover, concentrate, and purify the lithium, acid, and other materials.

As used herein, the membrane processing may substantially retain or permeate various streams. In this context, substantially means at least a majority or at least about 50 percent, in other approaches, at least about 70 percent, and in other approaches, at least about 90 percent retention or permeation as the case may be.

Turning to FIG. 1, an exemplary process 10 for the recovery of lithium from lithium-containing materials, such as a spent lithium-ion battery, is illustrated. While the process of FIG. 1 will be described using a spent lithium-ion battery or cell (such as a conventional 18650 lithium-ion cell) as the lithium-containing material, the process of FIG. 1 may also be used with other lithium-ion sources. Discussion of yet other processes using a lithium containing mineral deposits are provided later in this disclosure. In general, the recovery process 10 includes an acid treatment or digestion step 12, a pretreatment step 14, one or more acid filtration steps 16, and a lithium recovery step(s) 18. The membranes used and described herein are all acid-stable, meaning they can operate and withstand the low pH solutions used in the processes herein. An acid-stable membrane may include a polymeric base or barrier layer such as nylon or other polymers as described herein (modified as needed). The other materials of the membrane may be polysulfone or FRP (fiber reinforced plastic) rather than ABS or PVC. Epoxy resins are used to form the membrane tube, wrap, or frame. An outer wrap or layer may be polyurethane or polypropylene open mesh.

The acid treatment or digestion step 12 produces an acidic lithium solution 20 including one or more of an acid solution, lithium ions or lithium, soluble organic materials, soluble metals, and suspended solids. To produce the acidic lithium solution 20, battery solids 22 are first disassembled (not shown) into its component parts. In the case of a lithium-ion battery or cell, the unit to be processed is mechanically separated to remove the outside material or shell, be it metal or plastic, to gain access to the internal battery or cell components as discussed above. For a cylindrical 18650 lithium-ion cell, for instance, the components may be unwound and separated. Other types of cells or batteries may be separated or dissembled as needed for each cell type. The cell anode is usually a copper foil plate with graphite or other carbon material thereon, and it is physically separated from the cathode (an aluminum foil with cathode material thereon as discussed above) with a polymeric electrolytic matrix.

In the digestion step 12, the disassembled battery components 22 are added directly to a mixing tank 24 and solubilized with a low pH mineral or organic acid solution. The solubilized anode, cathode, and electrolyte material can be then filtered and lithium recovered from it using acid membrane technology in steps 14, 16, and 18 as shown in FIG. 1 and discussed more below. The entire electrolyte, anode, and cathode (either as a single unit or separate units) can be added to the mixing tank 24 as part of the battery solids 22. Typically, the entire electrolyte can be dissolved into the acid solution in the mixing tank 24. Graphite or graphene from the anode, the copper anode plate, and the aluminum cathode plate (along with other battery solids) can also be recovered as needed 26 from the mixing tank making the entire process substantially zero waste and sustainable. The cathode material can be cobalt nickel alloy that can be directly recovered with careful disassembly of the battery pack. Nickel alloys are not affected by the acid to remove the cathode from it so it can be recovered essentially intact. Other cathode materials are manganese oxides or other similar metallic oxides, but these are soluble in acids and once in solution can be purified, concentrated, recovered and likewise the acid is purified (concentrated if necessary) and recovered as discussed more below.

Based on the amount of lithium in a conventional lithium-ion cell (that is, about 1 to about 8 grams typically found in a 3.7 volt battery) and doing a rough mass balance on the acid solution, the methods of the present disclosure are capable of extracting up to the entire 8 grams into the acid solution quickly and effectively in the acid treatment or digestion step 12. Throughout the subsequent membrane recovery steps, the processes herein are then able to recover up to about 90 to about 99.5 percent of the starting lithium. Depending upon the acid type and concentration of acid and lithium extracted from the recycling process all steps can be applied or just one or two steps applied to achieve the most cost effective results.

In the acid mixing step 12, many acids potentially could be useful for this process. Suitable acids typically have a pH of about 2.5 or less and, in other approaches, a pH of about 0.3 to about 2.5. In one approach, the use of mineral acids is effective to place the electrolyte in solution and separate the cathode and anode. Suitable mineral acids include hydrochloric acid, sulfuric acid, nitric acid, and the like. The mineral acids may have concentration of about 0.5 to about 30 percent in aqueous solutions and have a pH of about 1 or less, and in other instances, a pH of about 0.3 to about 1, and in yet other instances, a pH of about 0.3 to about 0.5. While not as effective as digesting and separating the battery components, organic acids may also be used in the mixing step 12 as needed for particular applications. Suitable organic acids include acetic acid, citric acid, and the like. Organic acids may have a concentration of about 1 to about 30 percent in aqueous solutions and have a pH of about 0.1 to about 2.5, and in other instances, a pH of about 1.0 to about 2.5. Water or distilled water, which is commonly a good solvent, generally does not work in the mixing step 12 to dissolve and separate the battery component at ambient temperatures of about 25° C. and even at higher temperatures above ambient, such as elevated temperatures up to about 60° C. (or above).

The mixing step 12 may occur at a temperature from about 10° C. to about 100° C., in other approaches, about 25° C. to about 70° C., and in yet further approaches, about 50 to about 70° C. It was discovered, for instance, that heating the mineral acid (such as, a 13% HCL solution) from ambient temperature of about 25° C. to about 60° C. during mixing reduced the time to place electrolyte in solution by about 50 percent as compared to mixing at ambient temperatures as generally determined by the amount of lithium in the acid solution. In some approaches, mixing and digestion times can be from about 1 minute to about 120 minutes, in other cases, about 1 minutes to about 30 minutes, in yet other cases, about 10 minutes to about 15 minutes, and may vary depending on the acid and concentration used in the acid bath. In many instances, mixing time is about 10 minutes to about 2 hours.

The typical amount of lithium available in a conventional 3.7 V lithium-ion cell is about 1 to about 8 grams, in other approaches, about 4 to about 8 grams (depending on the cell type and manufacturer) and the acid solutions and mixing steps herein resulted in an acidic lithium solution 20 containing up to about 100 percent of the lithium from the starting battery in solution. In other approaches, the acidic lithium solution 20 after heating and mixing discussed above includes about 75 to about 99.5 percent of the lithium from the starting lithium battery source 22. In some approaches, the acidic lithium solution 20 after digestion may include about 100 to about 5000 ppm of lithium dependent upon the volume of the acid solution used to dissolve the lithium from the lithium-containing source, in other approaches, about 100 to about 1000 ppm of lithium, and in yet other approaches, about 500 to about 1000 ppm lithium, and in yet other approaches, about 100 to about 500 ppm lithium.

After the mixing or acid digestion step 12, the formed acidic lithium solution 20 may be transferred to an optional supernatant tank 27 and then to an optional feed tank 28 prior to the first membrane step or the pre-treatment step 14. The optional supernatant tank is a relatively wide or large tank in the process that holds the relatively clear solution of acid and lithium before directing the stream to the small balance feed tank 28 for the subsequent membrane processing.

At the pre-treatment step 14, the acidic lithium solution 20 is pre-treated with a first semi-permeable membrane 30. In one approach, the first semi-permeable membrane 30 is an acid-stable ultrafiltration membrane having a pore size of about 0.01 to about 0.5 microns. Suitable membranes may be hollow fiber, but the pre-treatment membrane 30 may also be spiral wound, plate and frame, or ceramic tube type membranes. Suitable materials for the pre-treatment membranes may be polyvinylidene difluoride (PVDF), polyvinyl chloride (PVC), polyacrylonitrile (PAN), polysulfone (PSF), or polyethersulfone (PES) and the like materials.

The pre-treatment 14 may be at a pressure of about 10 to about 100 psi, and in other approaches, about 20 to about 60 psi. The membrane 30 of the pretreatment step 14 concentrates or substantially retains 32 a majority of concentrated suspended solids and allows to pass or permeate 34 one or more of the acid solution, lithium ions or lithium, soluble organics, and soluble metals to form a filtered acidic lithium solution or stream 34. In some approaches, the retentate or concentrate 32 may then be recycled back to the mixing tank 24 as needed as backwash solution. In some approaches, the pre-treatment 14 has up to about a 98 percent recovery of the permeate and, in other cases, about 75 to about 100 percent recovery of the permeate. Percent recovery in the pretreatment step means the amount of permeate relative to the amount of feed.

Next, the permeate 34 (that is, the filtered acidic lithium solution) from the pre-treatment step 14 is delivered to the acid-filtration steps(s) 16, which include one or more acid-stable semi-permeable membrane(s). As shown, the filtered acidic lithium solution 34 may also pass through another optional feed tank 36 prior to the first acid filtration membrane. The acid-stable semi-permeable membranes in the acid filtration steps 16 may be chlorinated or modified membranes. As discussed more below, chlorination of the membranes may be beneficial in the acid filtration steps 16 in some instances to achieve the desired membrane pore sizes in order to tailor the separation process to reject and permeate the desired components.

As shown, the acid-filtration steps includes two separation steps 16a and 16b to separate the metals 38 and the lithium 40 from the acid solution 42. The first acid filtration step 16a may be a second semi-permeable membrane 39, such as a nanofiltration membrane or, as discussed more below, a chlorinated nanofiltration membrane. This additional membrane 39 forms a retentate stream 38 and a permeate stream 41. The retentate 38 includes one or both of the soluble organics and the soluble metals from the filtered acidic lithium solution feed 34. The rejected soluble organic polymers in stream 38 may include polypropylene and polyethylene from the battery or cell separator. The rejected soluble metals in stream 38 may include acid soluble divalent cations such as calcium, magnesium, zinc, copper, and the like metals. The rejected soluble metals in stream 38 may also include aluminum, iron, phosphate, fluoride, and in some instances, rare earth elements and the like metals. The rare earth elements may include, for instance, the lanthanides and scandium, yttrium, cerium, and other known rare earth elements. The rejected soluble metals in stream 38 may also include cobalt and nickel depending on the acid and starting lithium source. The permeate stream 41 includes the monovalent lithium ions or lithium and the acid solution. The metals in stream 38 can be recovered as needed.

The membrane separation 39 may have about 90 to about 95 percent recovery of the lithium and acid from the feed stream, and in other approaches, about an 80 to about a 99 percent recovery. As used herein, percent recovery through the nanofiltration membrane 39 is the amount of permeate 41 relative to the amount of feed 34. In some approaches, the nanofiltration membrane 39, such as a chlorinated nanofiltration membrane, may generate a permeate stream 41 having about 100 to about 200 ppm of lithium and the retentate stream 38 may have about 100 to about 200 ppm lithium. The retentate stream 38 may be about 5 to about 10 percent of the feed stream. As discussed more below, optional diafiltraiton may also be used on this process step if needed for a particular application.

The acid-stable semi-permeable membrane 39 may have a pore size of about 0.0007 to about 0.0012 microns and may be operated from about 200 to about 2000 psi, and in other approaches, about 200 to about 1800 psi, and in yet other approaches, about 500 to about 1000 psi. Suitable membranes for the first acid-separation step 16a may be hollow fiber, but the membranes 16a may also be spiral wound, plate and frame, or ceramic tube type membranes. Suitable materials for the first acid-treatment membranes 16a include polyamide and the like materials and may be commercially available from Toray, Hydranautics, Filmtec, GE and other commercial membrane supplies to suggest but a few suppliers.

In some instances, commercially available membranes for the acid-separation step 16a does not sufficiently reject and pass the desired materials at high enough flow rates and, thus, may be modified for use in the methods herein to provide higher flow, better selectivity, and more rapid delivery of fluids. To better tailor the separation steps, modified membranes may be used in some approaches herein. For instance, the acid-stable, semi-permeable membrane 39 may be a modified or chlorinated acid-stable, semi-permeable membrane, such as a chlorinated acid-stable nanofiltration membrane. The chlorinated membrane, more specifically, may be modified/chlorinated by soaking the membrane 39 in about 2 to about 4 percent chlorine (at a pH of about 10 to about 12) for about 2 to about 4 hours at ambient temperature (about 20 to about 30° C.) to open the membrane up to allow desired acid and lithium transmission but to still reject the metals and other divalent cations. After chlorination, the membrane may have a pore size of about 0.0007 to about 0.0012 microns and/or have a molecular weight cutoff of about 300 to about 400 daltons.

The acid membrane step 16a generally removes in stream 38 any acid soluble divalent cations like calcium, magnesium, aluminum and iron (and other components as discussed above), but substantially permeates in stream 41 clean acid with all or at least a majority of the monovalent lithium. Preferably, neither acid nor lithium are rejected by this membrane step 16a. This process step can run at any percent recovery, but when the process is run with greater than about 90% recovery, then the lithium concentration in the permeate 41 is actually greater than 100% of the feed concentration and the concentration of the lithium in the retentate 38 is less than the feed concentration. In some approaches, the amount of lithium in stream 41 may be 10 to 20 percent greater than lithium in stream 38. In some approaches, this feature of the processes herein is advantageous to the overall process in that it reduces the amount of lithium that will be lost in the acid separation step 16a. In some approaches, the high level of lithium recovery is aided with the use of diafiltration discussed more below.

The permeate stream 41 from the nanofiltration membrane 39 is a filtered acid and lithium solution 41 and includes mono valent lithium ions or lithium and the acid solution. It can be directed to an optional feed tank 43 and then to an additional acid separation step 16b. The additional acid filtration step 16b may be another semi-permeable membrane 44 such as a reverse osmosis membrane or, as discussed more below, a chlorinated reverse osmosis membrane. This additional membrane 44 forms a retentate 40 and a permeate 42. The retentate 40 includes concentrated lithium ions or lithium from the feed stream (the filtered acid and lithium stream 41). The retentate or concentrate stream 40 may include about 100 to about 1500 ppm of lithium ions or lithium and may be about 5 to about 10 g/l as lithium. The permeate stream 42 includes the acid solution, and the permeate 42 may be recycled back to the mixing tank 24 for use in the acid treatment or digestion of the initial battery solids as shown in FIG. 1. Alternatively, the permeate stream 42 may be further processed as discussed more below to separate the acid from the water.

The acid-stable semi-permeable membrane 44, may be a reverse osmosis membrane, and may have a pore size of about 0.0005 to about 0.001 microns and may be operated from about 200 to about 2000 psi, and in other approaches, about 1000 to about 1800 psi, and in yet other approaches, about 1000 to about 1500 psi. Suitable membranes for the additional acid-separation step 16*b* may be hollow fiber, but the membranes 16*b* may also be spiral wound, plate and frame, or ceramic tube type membranes. Suitable materials for the second acid-treatment membranes 16*b* include polyamide, polyaramide, and sulfonated polysulfones and the like materials and may be commercially available from Toray, Hydranautics, Filmtec, GE and other commercial membrane supplies to suggest but a few suppliers.

In some instances, commercially available membranes for this additional acid-separation step 16*b* also do not sufficiently reject and pass the desired materials at high enough flow rates and, thus, may be modified for use in the methods herein, and, in some approaches, provide less salt rejection leading to higher flux. To better tailor the separation steps, modified membranes may be used in some approaches herein. For instance, the acid-stable semi-permeable membrane 44 may also be a chlorinated acid-stable semi-permeable membrane, such as a chlorinated acid-stable reverse osmosis membrane. The chlorinated membrane 44, more specifically, may be modified/chlorinated by soaking the membrane in about 2 to about 4 percent chlorine (at a pH of about 10 to about 12) for about 2 to about 4 hours at ambient temperature to open the membrane up to allow desired acid transmission but to still reject the lithium ions or lithium. After chlorination, the membrane may have a pore size of about 0.0005 to about 0.001 microns and/or have a molecular weight cutoff of about 100 to about 150 daltons.

The membrane separation 16*b*, such as a reverse osmosis membrane, may have about a 90 to about a 95 percent recovery of the lithium from the feed stream, and in other approaches, about an 80 to about a 99 percent recovery. As used herein, percent recovery of membrane 44 is the amount of concentrate/retentate 40 relative to the feed stream 41. The reverse osmosis membrane 44, such as a chlorinated reverse osmosis membrane, may generate a permeate stream 42 with about 100 to about 700 ppm of lithium and the retentate stream 40 may have about 1000 to about 20,000 ppm lithium. The retentate stream 40 may be about 70 to about 98 percent of the feed stream. As discussed more below, optional diafiltraiton may also be used on this process step if needed for a particular application.

This third separation step 16*b* in the process uses the permeate acid 41 from prior nanofiltration membrane 39 that is free of most of the divalent cations. In this step, the acid membrane 44 concentrates (that is, rejects) up to about 95 percent, and in some cases about 90 to about 95 percent of the lithium and small amounts of acid. Depending on the selected acid, the rejected lithium may be in the form of lithium chloride, lithium sulfate, or lithium nitrate and so forth based on the acid used in the process. In some approaches, the acid rejection is low because potential osmotic pressure limits the percent recovery. A high recovery increases the concentration of lithium and reduces the volume to the next process step (that is, ion exchange, liquid ion exchange or electrolytic cell). Moreover, the permeate stream 42 contains small amounts of lithium (such as about 0.5 to about 10 percent) and about 50 to about 95 percent of the acid.

The concentrate or retentate steam 40 is then processed further to recover the lithium in one or more lithium recovery step(s) 18 in the form of lithium hydroxide or lithium carbonate, for instance. The lithium recovery may include an ion recovery step 44 such as an ion exchange, electro dialysis or both to recover the lithium. In some approaches, the recovered lithium is then mixed 46 with sodium hydroxide or sodium carbonate so that the lithium may be recovered 48*a* or 48*b* as either lithium hydroxide or lithium carbonate. Electro dialysis may be used to form lithium hydroxide after the pH of the solution is neutralized to a pH around 7. If needed, a nanofiltration membrane may be used to fractionate lithium hydroxide from lithium sulfate (if sulfuric acid is used to process or strip the ion exchange of lithium) after adsorption. If the solution includes lithium sulfate, then a concentration of 2 to 3 percent (20 k to 30 k) as lithium may be needed to preferentially precipitate lithium carbonate after the addition of sodium carbonate. A filter press may then be used to remove suspended solids and liquid before drying.

Optionally, the first acid filtration step 16*a* (and/or the second acid filtration step 16*b* if needed) may also employ diafiltration to improve the separation of lithium. In some cases, the concentrate stream 38 from the nanofiltration membrane 39 may still contain some levels of lithium, which may be in some approaches about 100 to about 150 ppm of lithium ions. Thus, diafiltration may optionally be performed on the filtration step 16*a* and the concentrate stream 38 by adding one volume of water or, optionally, reverse osmosis permeate 42, to dilute the lithium in the concentrate stream 38 by half. The nanofiltration membrane 39 then concentrates the volume in stream 38 back to its original amount, but because the membrane 38 does not rejection lithium, the permeate stream 41 will contain higher amount of lithium (in some cases about 60 to about 70 ppm more of lithium) and the concentrate stream 38 will include less lithium (in some cases, about 50 percent less or about 60 to about 70 ppm less of lithium). For instance, the permeate 41 may have about 150 to about 200 ppm of lithium and the retentate 38 may have about 100 to about 140 ppm of lithium. For both the nanofiltration and reverse osmosis retentates, because these streams retain acid, the optional diafiltration can wash the acid from the retentates and increase the pH (which is advantageous for the next process step of ion exchange). The diafiltration fluid may be deionized water, tap water, low pH fluids (from any prior process stream including acid), high pH or brine waters (such as sodium chloride solutions with 100 ppm to 30,000 ppm) to change the chemistry of the concentrate if needed.

In some approaches, because of the nature of the modified nanofiltration and modified reverse osmosis membranes, the processes herein can pair-up lithium or cobalt with chloride, sulfate, nitrate, or hydroxide that would otherwise be rejected with conventional membranes. With the modified membranes, these materials are now transmitted because of the change in ionic make-up (not just ionic balance with pH) so that the ionic pairs that the membrane rejects or permeates are optimized for further processing.

The permeate stream 42, which substantially contains transmitted acid solution is often recycled back to the acid treatment or acid digestion step 12 as depicted in FIG. 1. However, in yet another optional step, the permeate stream 42 may also be further processed 50 to separate the acid from the water using a seawater type reverse osmosis membrane 52 rolled with the proper materials to withstand the low pH permeate stream 42. Membranes may have materials with a high wale count and high epoxy content and/or fine mesh stainless steel. Operating pressures may be about 1000 to about 3500 psi and temperatures of about 10 to about 80° C. with acid contents of about 1 to about 50 percent (in some cases, about 1 to about 30 percent). As with the other membranes, suitable membranes for the additional separation 50 may be hollow fiber, but the membrane 52 may also be spiral wound, plate and frame, or ceramic tube type membranes. Suitable materials for the membrane 52 include nylon, sulfonated polysulfone, polyaramide and the like materials and may be commercially available from Toray, Hydranautics, Filmtec GE and other commercial membrane supplies to suggest but a few suppliers. This optional separation step may provide make-up water and/or aid in the recovery of lithium in the acid stream.

Figure 2:
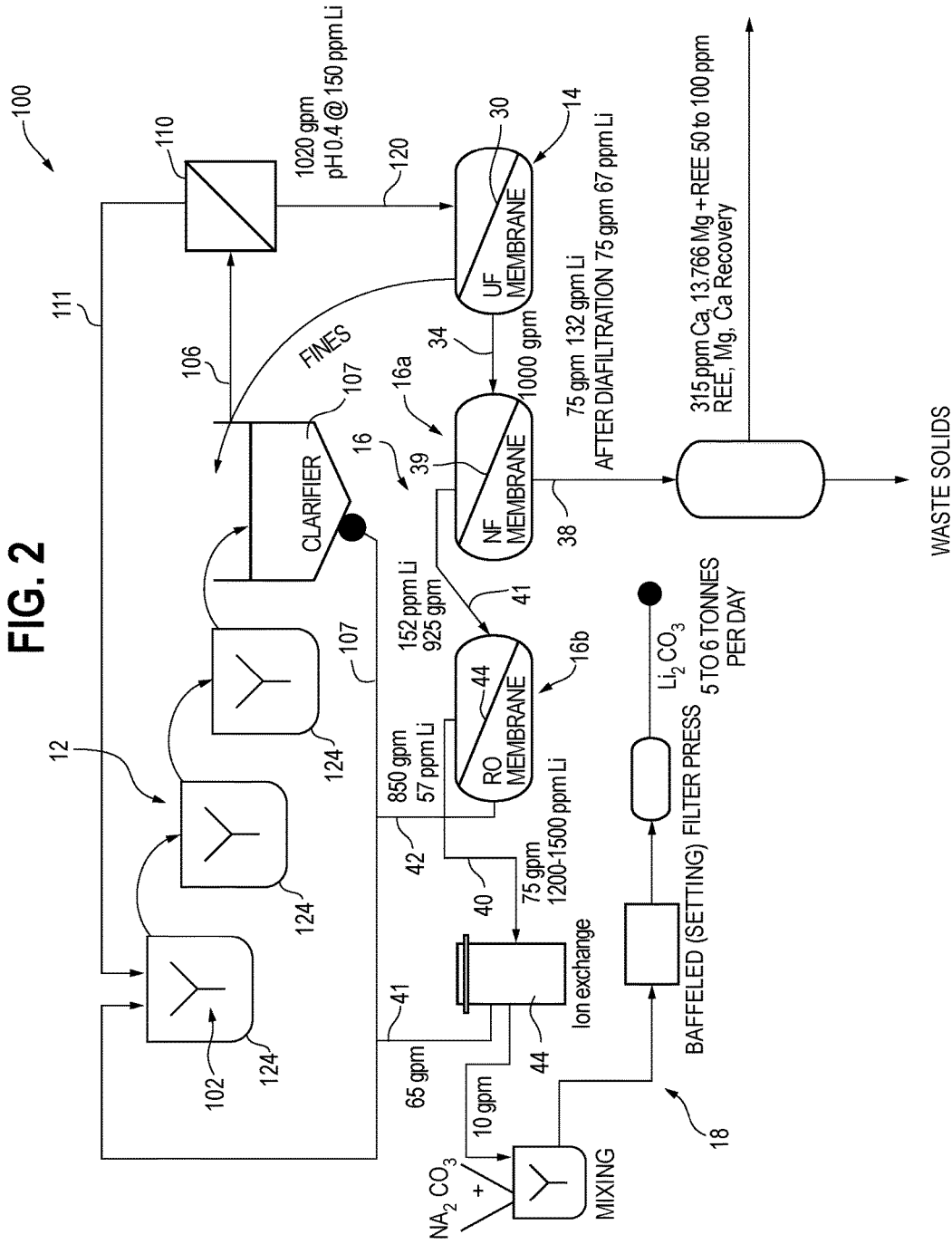
FIG. 2 is another flow diagram of an exemplary lithium recovery process.

Turning to FIG. 2, an example of a similar process 100 for the recovery of lithium from a lithium-containing material, which in this instance is a lithium-containing mineral pulp or deposit (that is, a lithium bearing solids), such as but not limited to lithium-containing clays like hectorite, montmorillonite, illlite, smectite, kanolite, bectonite, spodumene, and the like substances, to name but a few examples. The extraction of lithium from mineral or clays is a similar process to the one discussed above relative to FIG. 1. A few of the differences will be described here, but otherwise the process 100 is similar to process 10 of FIG. 1

First, the lithium bearing pulp 102 is digested 12 with an acid in one or more digestion steps/tanks 124 as shown in FIG. 2. This process can be enhanced by heating the mixing tanks 124 to about 50 to 100° C. (in other approaches, about 50 to about 60° C.) but the heating is optional. The digesting or leaching 12 may occur in one or more sequential leaching steps. In FIG. 2, three are shown, but the leaching may be one, two, or more sequential leach steps as needed for a particular starting material.

The acid-leached pulp is then removed from the tank 124 or the last of the sequential tanks 124 into a clarifier or other separation process 107. A supernatant 106 is separated from the solids through the clarifier or other separation process 107. The leached supernatant 106 solutions can have about 50 to about 5000 ppm lithium, and in other cases, about 50 to about 1000 ppm, and in yet other instances, about 100 to about 1000 ppm lithium dependent on the acid and ratio of liquid to lithium in the solids or battery. The supernatant 106 may be first pre-filtered 110 with one or more gross filtration steps using 100 to 200 micron screen(s), then polished with one or more 0.01 to 0.1 micron pore size back-washable hollow fiber filter(s), which removes the majority to all of any remaining suspended solids to form an acidic lithium solution 120 as the feed to the subsequent membrane filtration steps 14 and 16 and purifying steps 18, which are similar to those previously described. Separated solids 111 from the back wash filter steps 110 may be recycled back to the mixing and acid digestion 12 into one or more of the mixing tanks 124.

Similar to the above process 10, the acidic lithium solution 120 is then pretreated 14 with a first or pretreatment membrane 30. The permeate 34 thereof is processed with one or more acid-separation steps 16, such a first acid-separation 16*a*, and a second acid-separation 16*b*, prior to the purification and concentration of the lithium 18. These separation steps are similar those already discussed above.

As shown in FIG. 2, the process 100 may also employ recycle streams from the one or more separation steps back to the acid digestion step 12. For instance, the bottoms 107 of the clarifier may recycled back to one or more of the mixing tanks 124. The bottoms 107 may also be combined with the permeate 42 and/or the ion exchange wash stream 41 as needed for a particular application.

In some cases, the acid treatment or digestion steps 12 for lithium containing pulp may include more than one leaching step. If used, the optional second leach step (or the optional third leach step) aids to increase the overall lithium recovery, despite increasing the acid consumption and water volumes to be processed, it could be cost effective because of the effectiveness of the membrane processes to concentrate lithium. In general, when at least two leach steps of pulp were used, extractions increased up to about 97% of lithium recovery from the pulp. A third leaching step as shown in FIG. 2 may also be used as needed.

For the digestion, a pulp-to-liquid ratio of about 1:2 to about 1:20, and in other approaches, about 1:2 to about 1:6, and in yet other approaches, about 1:5 to about 1:6 for a first or initial leaching step. The liquid mixture may be any of the acid solutions discussed above and water. The mixture can be stirred for about 1 to about 2 hours, and in other approaches, about 15 minutes to about 1 hour, and then settled for about 4 to about 6 hours. If a second or subsequent leaching step is used where the leached pulp from the first leach step is used as feed for the second leach, a lower pulp-to-liquid ratio may be used, such as a 1:2 to about 1:5, and in other approaches, about 1:2 to about 1:3. Mixing and settling times may be reduced for any subsequent leaching steps and may vary from about 5 minutes to about 1 hour for mixing times and about 15 minutes to about 1 hour for settling times second (or third) leaching steps.

To improve the digestion, certain polymers may be used in the mixing tank/leach vat to change the positive charge on the clays. This may aid in the reduction of the clarification and settling times. In some approaches, the polymers or polymeric material may be alkyl carbonates and mixtures of alkyl carbonates. Suitable carbonates include, but are not limited to ethylene carbonate, propylene carbonate, diethyl carbonate, and the like polymers. EPC or epichlorohydrin may also be used In the initial leaching step, the lithium ion recovery rate may be about 50 to about 99 percent, in other approaches, about 70 to about 80 percent of the lithium from the feed pulp recovered into the supernatant. To improve the extraction of lithium, the second leach step may then be performed. The second acid leach uses the leached pulp from the first leach step as feed stock, but at reduced acid concentration (such as about 1 to about 5 percent acids) and reduced pulp-to-liquid ratios. In the second leaching, for instance, about 2 to about 4 percent acids, such as about 2.5 percent sulfuric acid (or other acids as mentioned above) may be used, and a pulp-to-liquid ratio of 1 part pulp (filtered) to 2 parts liquid may be used. Because the pulp had previously been leached, the second leach acid consumption was less due the fact that most of the carbonates had been digested in the first leach. As a result, both the mixing and the settling times may be reduced to about 30 minutes and about 2 hours, respectively One advantage of the processes herein is to reduce the volume of large, dilute streams, in this case lithium, into small volumes of concentrated lithium. In addition, the process may recover both acid and water for reuse.

A better understanding of the present disclosure and its many advantages may be clarified with the following examples. The following examples are illustrative and not limiting thereof in either scope or spirit. Those skilled in the art will readily understand that variations of the components, methods, steps, and devices described in these examples can be used. Unless noted otherwise, all percentages, ratios, and parts noted in this disclosure are by weight.

EXAMPLES

Example 1

Examples of acid digestion were performed on copper cathodes from a battery with 5% sulfuric acid. Different digestion times and temperatures were evaluated with respect to the extraction of lithium from the battery components. Results are shown in Tables 1 and 2 below. This study used a 1 to 10 ratio of liquid to mass in Table 1, and a 1 to 5 ratio of liquid to mass in Table 2.

TABLE 1

Digestion of a cathode-copper with 5% acid after about 15 minutes of digestion at ambient temperature (25° C.)

| Component | Result | Reporting Limit | Unit | Method |
|---|---|---|---|---|
| Lithium, Li | 154 | 0.1 | mg/L | AAA |
| pH | 0.34 | — | pH Units | Electrometric |
| Copper, Cu | <0.1 | 0.1 | mg/L | AAS |

TABLE 2

Digestion of a cathode-copper with 5% acid after heating for about 2 hours at 70° C.

| Component | Result | Reporting Limit | Unit | Method |
|---|---|---|---|---|
| Lithium, Li | 337 | 0.1 | mg/L | AAA |
| pH | 0.27 | — | pH Units | Electrometric |
| Copper, Cu | 1.1 | 0.1 | mg/L | AAS |

Example 2

An electrolyte from a cell was disassembled and digested in sulfuric acid. Digestion occurred for about 2 hours at 70° C. Table 3 below provides the results of the digestion. A ratio of 1 to 2 liquid to mass was used in this study.

TABLE 3

Digestion of electrolyte with 5% acid after about 2 hours of digestion at 70° C.

| Component | Result | Reporting Limit | Unit | Method |
|---|---|---|---|---|
| Lithium, Li | 4.909 | 0.1 | mg/L | AAA |
| pH | 0.30 | — | pH Units | Electrometric |
| Copper, Cu | 765 | 0.5 | mg/L | AAS |

Example 3

An acid leaching of six different lithium-containing minerals or pulp was completed. Each mineral bearing pulp contained approximately 960 ppm of lithium. For the digestion of each sample, about 12.6 Kg of the pulp and solution was digested with a 5% sulfuric acid solution. For the digestion, a pulp-to-liquid ratio of about 1 part pulp to 5.25 parts liquid mixture was used. The mixture was stirred for about 1 hour, and then settled for about 4 to about 6 hours.

To improve the digestion, it was determined that the addition of certain polymers may be used to change the positive charge on the clays and that this reduced the clarification and settling time. Thus, about 1 to about 5 ppm of epichlorohydrin was added to the mixing tank.

In this initial leaching, the lithium ion recovery rate was about 80% of the lithium from the feed pulp recovered into the supernatant. To improve the extraction of lithium, a second leach was then performed. The second acid leach used the pulp from the first leach as feed stock, but at reduced acid concentration and reduced pulp-to-liquid ratios. In the second leaching, about 2.5 percent sulfuric acid was used, and pulp-to-liquid ratio of 1 part pulp (filtered) to 2 parts liquid. Because the pulp had previously been leached, the second leach acid consumption was less due the fact that most of the carbonates had been digested in the first leach. As a result, both the mixing and the settling times were reduced to about 30 minutes and about 2 hours, respectively. The supernatant from second leach, although lower in lithium concentration, did increase the overall lithium extraction from both the first and second leaching (compared to the initial feed) to about 90 percent in this experiment. The following test procedures and results were evaluated for this experiment:

TABLE 4

First Leach Mixture Ratios and Settling Times

2 Kilograms of pulp (clay hectorite)
10 Kilograms of Water and 500 grams of sulfuric acid (Total of 12.5 kg Mixture)
5 ppm polymer (EPC)
Mix for 1 hour
Settle for 4 hours The solids from the first leaching were filtered with a 250 micron screen and then a 100 micron screen to form the supernatant. The resultant filtered pulp retained approximately 0.68 Kg of water. The supernatant was analyzed for lithium content and saved for membrane processing. The supernatant of Table 5 below included about 787.5 ppm of lithium (as compared to the about 960 ppm in the starting pulp).

TABLE 5

Mass balance for first leach

| | Mass |
|---|---|
| Liquid of Feed | 10.5 kg Liquid 10 Kg water and 5% Acid |
| Pulp in Feed | 2.0 Kg Pulp (960 ppm of lithium) |
| Total in first leach | 12.5 Kg Pulp and Liquid |
| (minus) | 2.68 Kg Pulp and liquid in pulp [That is, the pulp and liquid filtered out] |
| Total | 9.82 Kg Liquid at pH 0.4 [the supernatant] |

Example 4

A small sample of filtered pulp solids from Example 3 containing about 100 grams (6.5% liquid at pH 0.4) was subjected to a second leaching with sulfuric acid. About 100 grams of the first leach pulp was combined with about 200 ml of water and about 10 ml of sulfuric acid. The solution was mixed for about 30 minutes and then allowed to settle for about 1 hour. After settling, the pulp was filtered with a 100 micron screen to produce a supernatant. The filtered pulp of this second leach process weighed about 96.5 g (about 3.5% water was retained in pulp). The supernatant and solids were analyzed for lithium content and shown in Table 6 below.

TABLE 6

First and Second leach analysis

| Analysis | Value | Notes |
|---|---|---|
| PPM of lithium extracted in first leach | 787.5 ppm | 5.25 (concentration factor) × 150 ppm |
| % lithium recovered in first leach | 82% | |
| PPM of lithium extracted in second leach | 74.1 ppm | 1.95 (concentration factor) × 36 ppm |
| Total PPM of lithium recovered in first and second leaching | 861.6 ppm | |
| Total % recovered in first and second leach | 90% | |

Example 5

The supernatant from the first leach of Example 3 was further processed using the membrane processing of the present disclosure and as shown in FIG. 2. Feed volumes to each separation step are provided in Table 7 below.

TABLE 7

Feed volumes to separation steps.

| Process | Feed volumes | Kg as Permeate | KG as Concentrate | % Recovery |
|---|---|---|---|---|
| UF | 9.82 Kg | 9.62 | 0.2 Kg | 98 to 100% |
| NF | 9.62 Kg | 8.90 | 0.72 Kg | 92.5% |
| RO | 8.90 Kg | 8.16 | 0.74 Kg | 91.7% |

Total lost liquid in the processes of Table 8 included about 15 percent in the NF concentrates. Total lost lithium included about 7.5% combined UF and NF concentrates with diafiltration. Total acid consumed or lost was estimated to about 40 percent for digesting the pulp.

As shown in Table 7, the NF feed or nanofiltration feed was the 9.62 Kg permeate stream from the UF process that contained about 150 ppm of lithium. Nanofiltration resulted in about 8.9 Kg of permeate and about 0.72 Kg of retentate, which included magnesium, calcium, and REE (rare earth elements). The concentrate stream from the nanofiltration membrane concentrate stream included about 132 ppm of lithium. The nanofiltration membrane was chlorinated with 2% chlorine in deionized water at 80° F. for about 2.5 hours.

Using diafiltration with the NF feed, the lithium in the 0.72 Kg concentrate stream can be reduced from about 132 ppm (prior to diafiltration) down to about 67 ppm, but it also increases the volume to be processed with the subsequent RO. Hence, the lithium concentrated by RO will be slightly larger, which reduces the lithium loss from NF processing to only about 7.5%.

In some aspects, a unique characteristic of the NF membrane processing at these pressures and % recoveries is that permeate has higher lithium content (for instance, about 152 ppm in the concentrate as compared to 150 ppm in the feed and consequently lower lithium in the concentrate 132 ppm. Thus, in some approaches, just one diafiltration step will reduce the loss to about 7.5% or less.

Example 6

Supernatant from first leach of Example 3 was passed through a pressurized hollow fiber 0.04 micron pore size membrane (Osmoasia, Thailand). The membrane was PVC, but could be DVDF, PS, PES, or cellulose. The system ran at 98% recovery, which means that the 9.82 kg of the feed volume was converted to 9.62 Kg of clean permeate with no suspended solid and a silt density index (SDI) of less than 0.1.

The initial concentrate mass 0.49 Kg was saved. Because the predominately clay solids were concentrated (20×) at 95% system recovery the solids settled rapidly. Recovering another 0.29 Kg of liquid for an overall liquid recovery of 98% (9.62 Kg). The remaining mass (clay fines) could either neutralized or potentially recovered by recycling it back to the first leach acid mix tank.

Example 7

The 9.62 Kg of clean permeate of Example 6 at a pH of 0.4 was further processed using a NF membrane. The nanofiltration membrane was chlorinated using the same chlorination conditions as described in Example 5. The acid NF process ran at about 92.5% recovery or about 8.35 Kg as permeate and 0.72 Kg as concentrate. The pressure to achieve 92.5% recovery was about 54 Bar.

The NF concentrate (0.72 Kg) contained calcium, magnesium, rare earth elements (REE) and a lower amount of lithium (132 ppm) in the concentrate than lithium in the feed (150 ppm), but the volume was reduced by 92.5%. This phenomenon is advantageous to the process as it helps minimize loss of the lithium extracted from the clay. As discussed above, using diafiltration, higher ppm of lithium (greater than 100% of available lithium) can be passed into the composite permeate (that is, about 152 ppm in the concentrate as compared to about 150 ppm in the feed) at high recoveries is an advantageous result of the processing herein. Without wishing to be limited by theory, it is believed this higher recovery of lithium is achieved because of preferential permeation of monovalent lithium cations. However, with this process step, one goal is to reject magnesium, calcium and REE.

If needed, diafiltration is used where the addition of 0.72 Kg of liquid to the 0.72 Kg concentrate for a total of 1.44 Kg of new feed volume that is recycled back to the NF feed. This new feed volume is reduced by 50% using same NF membrane to permeate 0.9 Kg removing 50% of lithium that was in the original concentrate. In this step, dilute concentrate acid and lithium is recovered from the original NF retentate. The permeate from this step is recycled to the feed of the next RO step (Example 8) where it is now concentrated and recovered as product instead of being lost. In some cases, lithium is lost in the NF concentrate, but diafiltration can reduce the lost lithium.

Example 8

The 8.9 Kg of the NF permeate (with 152 ppm of lithium) from Example 7 was used as feed for the next process, which was a reverse osmosis membrane. The reverse osmosis membrane was chlorinated using the same chlorination process as described in Example 5. The acid RO was run at about 91.7% recovery at about 50 bar to retain about 0.74 Kg of concentrate containing of lithium. The permeate of this step was about 8.16 Kg and contained about 57 ppm lithium and was at a pH 0.4. If needed, all the permeate may be recycled and re-used as make-up solution for the acid leach steps as this stream contains low hardness water with acid as discussed above.

The 0.74 Kg of concentrate included about 556 ppm lithium, which is believed may be a measurement error accounting for only half of the lithium in lithium sulfate. However, a mass balance on the feed and the permeated concentrate also suggested the process may be able to concentrate up to about 1200 ppm. The concentrated lithium is in a small volume that is suitable for the next process step of either Ion Exchange or electrodialysis or both It is to be understood that while the materials and methods of this disclosure have been described in conjunction with the detailed description thereof and summary herein, the foregoing description is intended to illustrate and not limit the scope of the disclosure, which is defined by the scope of the appended claims. Other aspects, advantages, and modifications are within the scope of the claims.

What is claimed is:

1. A method of recovering lithium from a lithium-containing material, the method comprising:
    mixing a lithium-containing material in an acid solution to form an acidic lithium solution, the mixing at a temperature of about 10° C. to about 100° C., and the acidic lithium solution including at least one or more of the acid solution, lithium, soluble organics, soluble metals, and suspended solids;
    delivering the acidic lithium solution to an ultrafiltration pretreatment membrane to retain a majority of the suspended solids and to permeate a filtered acidic lithium solution including at least one or more of the acid solution, the lithium, the soluble organics, and the soluble metals;
    delivering the filtered acidic lithium solution to a nanofiltration membrane to form a retentate and a permeate, the nanofiltration retentate includes one or both of the soluble organics and the soluble metals and the nanofiltration permeate forms a filtered acid and lithium solution including the acid solution and the lithium;
    delivering the filtered acid and lithium solution to a reverse osmosis membrane to form a retentate and permeate, the reverse osmosis retentate includes the lithium and the reverse osmosis permeate includes the acid solution;
    recovering lithium salts from the reverse osmosis retentate to form the recovered lithium and, optionally, recycling the reverse osmosis permeate to the mixing step; and
    wherein the lithium-containing material is a lithium ion cell or battery or a lithium-containing mineral deposit.

2. The method of recovering lithium of claim 1, wherein the acid solution includes hydrochloric acid, sulfuric acid, nitric acid, acetic acid, citric acid, and combinations thereof.

3. The method of recovering lithium of claim 1, wherein the acid solution has a pH of about 2.5 or less.

4. The method of recovering lithium of claim 1, wherein one or both of the nanofiltration membrane and the reverse osmosis membrane are chlorinated.

5. The method of recovering lithium of claim 4, wherein the ultrafiltration pretreatment membrane has a pore size of about 0.01 microns to about 0.5 microns and is operated at about 10 to about 100 psi.

6. The method of recovering lithium of claim 4, wherein the nanofiltration membrane has a pore size of about 0.0007 microns to about 0.0012 microns and is operated at about 200 to about 2000 psi.

7. The method of recovering lithium of claim 4, wherein the reverse osmosis membrane has a pore size of about 0.0005 microns to about 0.001 microns and is operated at about 200 to about 2000 psi.

8. The method of recovering lithium of claim 1, wherein the lithium-containing material is the lithium ion battery or cell including a metal oxide cathode, a carbon anode, an electrolyte, and a polymeric separator and wherein the mixing step includes placing the metal oxide cathode, the carbon anode, the electrolyte, and the polymeric separator in the acid solution.

9. The method of recovering lithium of claim 1, wherein the lithium-containing material is the lithium containing mineral deposit and wherein the mixing step includes a ratio of the lithium containing mineral deposit to the acid solution of about 1:2 to about 1:20 to leach the lithium from the lithium containing mineral deposit to form the acidic lithium solution.

10. The method of recovering lithium of claim 9, wherein the mixing step of the lithium containing mineral deposit and the acid solution further includes a polymeric material selected from alkyl carbonate and mixtures of alkyl carbonates.

* * * * *